(No Model.) 3 Sheets—Sheet 2.
W. E. POST & S. J. NEVINS.
MATRIX MOLDING AND DRYING APPARATUS.
No. 512,215. Patented Jan. 2, 1894.
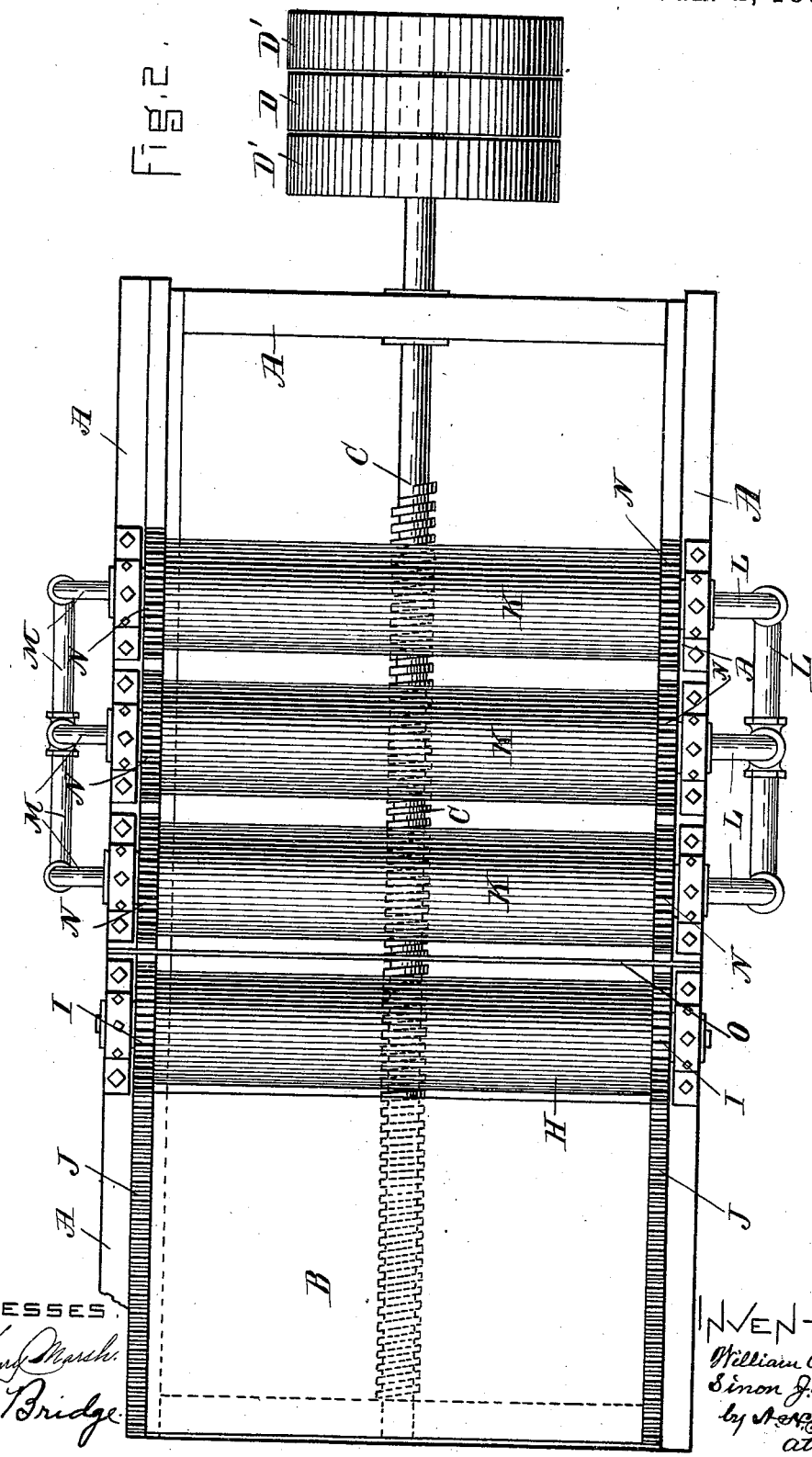

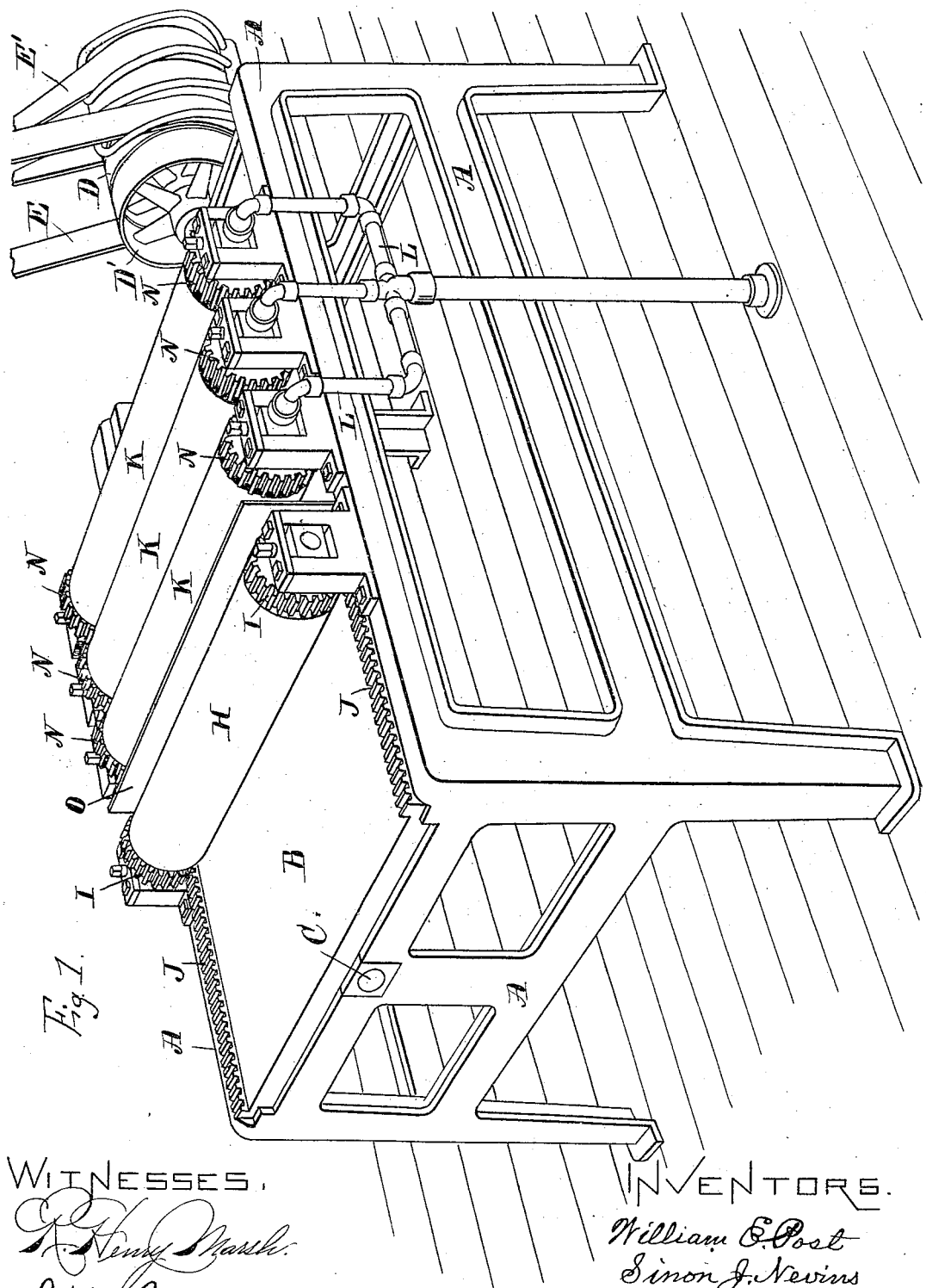

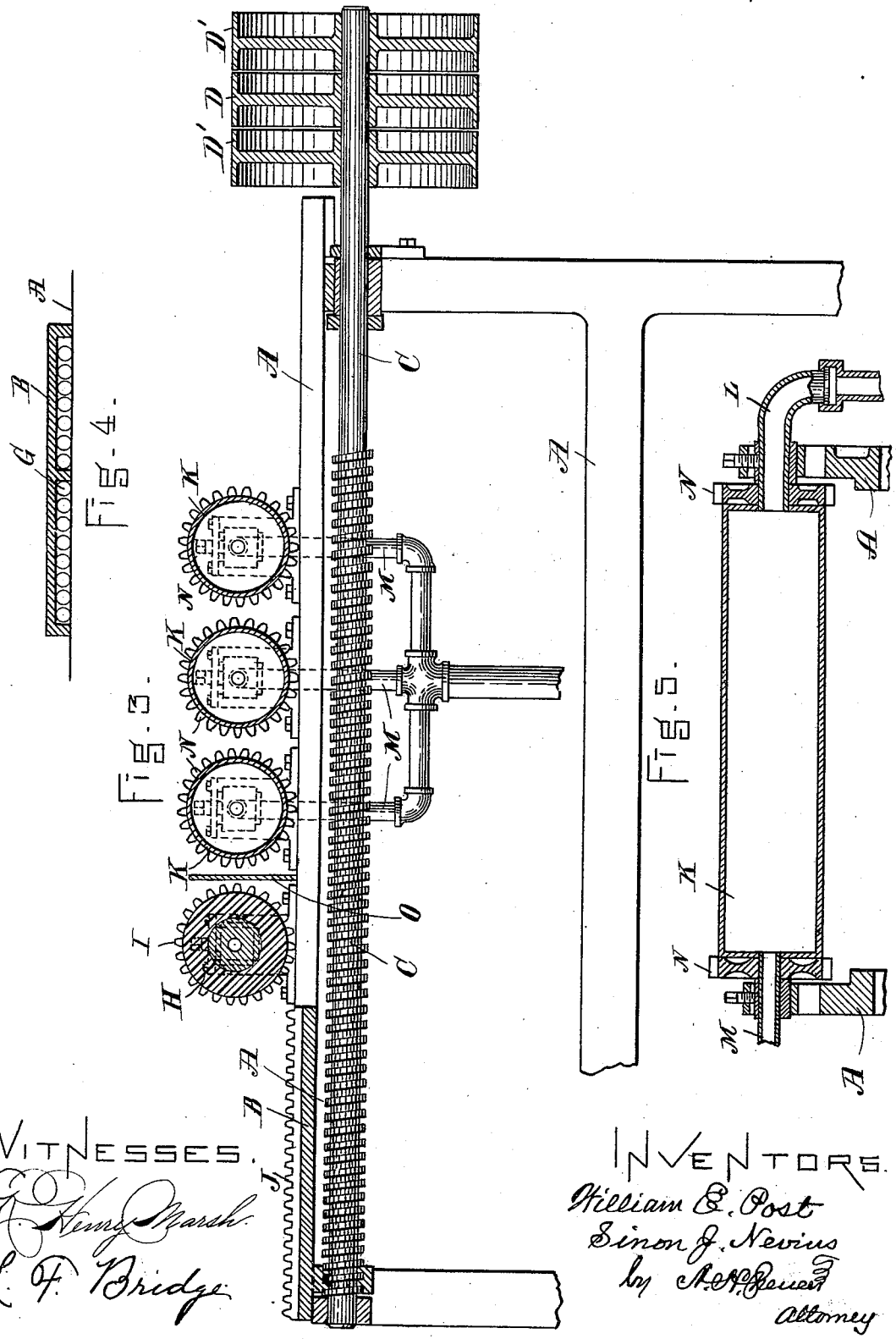

UNITED STATES PATENT OFFICE.

WILLIAM E. POST, OF MELROSE, AND SINON J. NEVINS, OF BOSTON, MASSACHUSETTS.

MATRIX MOLDING AND DRYING APPARATUS.

SPECIFICATION forming part of Letters Patent No. 512,215, dated January 2, 1894.

Application filed March 20, 1893. Serial No. 466,832. (No model.)

*To all whom it may concern:*

Be it known that we, WILLIAM E. POST, of Melrose Highlands, in the county of Middlesex, and SINON J. NEVINS, of Boston, in the county of Suffolk, State of Massachusetts, have jointly invented certain new and useful Improvements in Matrix Molding and Drying Apparatus, of which the following, taken in connection with the accompanying drawings, is a specification.

This invention is a new departure in matrix making apparatus, the object being to facilitate the operation, to lessen the time required for molding and drying the matrix, to perform both these functions in one continuous operation, and, by applying the heat to the upper surface of the plastic mass instead of beneath the type-form, to increase the durability of the type by subjecting it to much more moderate temperatures. Our improved method begins to dry the matrix immediately after it is molded so that both operations may go on simultaneously on different parts of the same matrix and without its removal from one apparatus to another.

Our invention involves the use of a movable bed on which the type-form rests, one or more elastic rollers to compress the plastic material upon the type-face with absorbent blankets between such rollers and material, and two or more steam-heated pressure rollers to heat and dry such material and blankets when moved upon said bed beneath said rollers. Gears on the rollers engage with a rack on the upturned edges of the bed. Means are provided for giving a reciprocating motion to the bed, preferably a screw shaft with reversing gear. A vertical shield is interposed between the rubber and the steam-heated rollers to preserve the rubber from injury if too near the heated roller. The rubber roll may be raised out of contact with the blanket during the movements incident to drying. The steam outlet may be of less capacity than the inlet.

In the drawings, Figure 1 is a perspective view of a machine constructed according to our invention. Fig. 2 is a top plan of such machine. Fig. 3 is a vertical, longitudinal section through said machine on the line 3—3 Fig. 2. Fig. 4 is a detail section of the bed and its anti-friction rollers, and Fig. 5 a cross-section of the machine, through one of the steam-rollers.

A represents a suitable rectangular frame having a flat top to support the traveling bed B, which moves in a horizontal plane when actuated by proper mechanism. As herein shown, the screw shaft C, having bearings in the frame for rotary motion only, is revolved by pulleys D and D′ and belts E and E′, shown in Fig. 1, and the screw engages in the threads of a female screw formed in downward projections F of the bed. A reciprocating motion is given to the bed B by reversing the direction of rotation of the screw. For this purpose the central pulley D may be fast on the screw shaft C and the pulleys D′ loose thereon; then when the straight belt E is on the fast pulley the screw will turn in one direction, but when the crossed belt E′ runs thereon this direction of rotation will be reversed, the driving pulley above being constant. The bed B may move on any suitable ways on the frame; but, to avoid unnecessary friction and possible springing of the bed or frame, we prefer to introduce between them a series of anti-friction rolls G, kept in place by marginal and intermediate flanges on the under side of the bed, as shown in Fig. 4. The type-form is laid face upward upon the bed B with the usual layer of plastic material upon it to form the matrix and with the usual blanket over this material to absorb its moisture.

One or more rubber-covered molding rollers H extend across the frame with firm adjustable bearings thereon. Gear wheels I are fixed on the shaft of such roller to engage with straight racks J formed on the upturned edges of the bed B, so as to rotate the molding roller when the bed is moved. The yielding character of the roller H enables it to press the plastic material into the most intimate contact with the type face, such pressure being capable of regulation by adjusting screws.

Parallel with and adjacent to the roller H we arrange a succession of pressing and drying rollers K, which act upon the matrix being formed and speedily eliminate the moisture therefrom. These rollers are hollow and steam heated, being provided with inlet pipes L and outlet pipes M, having flexible joints to permit any necessary yielding to the rollers. Gears N on the steam rollers engage with the racks J on the bed for rotation as the bed reciprocates.

O represents a suitable vertical shield which may be interposed between the rubber roller and the steam-heated rollers, to avoid injury to the rubber which would result if they were placed too near it without some protection.

We claim as our joint invention—

1. In a matrix molding and drying machine, a reciprocating bed on which the form rests, in combination with a yielding molding roller and with hollow, heated drying rollers and connecting pipes therefor, substantially as set forth.

2. The frame A, the bed B having a reciprocating motion thereon, and the rack C formed on the upturned edge of such bed, in combination with a yielding molding roller and two or more hollow, steam-heated rollers, gear wheels on said rollers engaging with said rack, and suitable actuating mechanism, substantially as set forth.

3. The frame A, the reciprocating bed B, and a series of anti-friction rollers interposed between them, in combination with a rubber molding roller, steam-heated drying rollers and a shield between such molding and drying rollers, substantially as set forth.

4. The described method of molding and drying matrices in one continuous operation, consisting in impressing the plastic material upon the face of the type-form with an elastic advancing pressure, simultaneously moving such form and material forward and pressing, heating and drying the matrix from above while thus moving it, substantially as set forth.

In testimony whereof we have signed our names to this specification, in the presence of two subscribing witnesses, on this 10th day of March, A. D. 1893.

WILLIAM E. POST.
SINON J. NEVINS.

Witnesses:
A. H. SPENCER,
JOHN C. LANE.